United States Patent [19]

Khazin et al.

[11] Patent Number: 4,907,827
[45] Date of Patent: Mar. 13, 1990

[54] SELF-ORGANIZER

[76] Inventors: Leon Khazin, 425 Selma St., Philadelphia, Pa. 19116; Leonard Kravets, 19 Addington Dr., Feasterville, Pa. 19047

[21] Appl. No.: 169,594

[22] Filed: Jun. 3, 1988

[51] Int. Cl.⁴ .................. B42D 15/00; G09F 1/00; G09D 3/00
[52] U.S. Cl. .................... 283/65; 40/124.1; 40/107
[58] Field of Search ............... 283/56, 65; 434/106, 434/128, 98, 365, 430; 84/471 R; 312/234; 40/107, 124.1; 261/DIG. 4

[56] References Cited

U.S. PATENT DOCUMENTS

| | | | |
|---|---|---|---|
| 1,449,045 | 3/1923 | Hollander | 283/65 |
| 2,984,031 | 5/1961 | Giesecke | 40/124.1 |
| 3,015,899 | 1/1962 | Ensign et al. | 40/124.1 |
| 3,113,779 | 12/1963 | Guenther | 283/65 |
| 4,176,478 | 12/1979 | Brewer | 40/107 |
| 4,431,214 | 2/1984 | Buffington | 283/65 |
| 4,461,497 | 7/1984 | Downey | 283/65 |

FOREIGN PATENT DOCUMENTS 2588683  4/1987  France ................... 283/65

Primary Examiner—Frank T. Yost
Assistant Examiner—Paul M. Heyrana, Sr.

[57] ABSTRACT

A self-organizer or self-reminder which is used by people to remind themselves about very important steps or things, which should be done prior to leaving home or business to assure safety of the above premises.

9 Claims, 7 Drawing Sheets

SELF-ORGANIZER

DESCRIPTION OF PRIOR ART

A lot of people, if not most of them, have a tendency to forget about many little, but very important things to do, which can be very dangerous and costly later. For example, they leave turned on coffee-maker, iron, lamp, kerosene-heater, gas range, stove, etc., which can cause fire, flood, loss of valuables, even may cost life.

Therefore, people use a wide variety of notes to remind themselves, their co-workers, their family members, especially elderly and children, to shut off the light, kerosene-heater, lock the door, close the windows, and so forth.

They attach their notes to the refrigerators with a piece of tape, or a small magnet. Some people write a note and tape it to the entrance door, leave notes on the kitchen table, some make a knot on their hangkerchief, some even put a small bow on their finger, which suppose to remind them to shutt off their electrical appliances, or close the windows. But these reminders can get lost, misplaced, or forgotten, especially if people are in a hurry, and they usually take care of only one or two possible problems.

That is why most of the people would find it very desirable to have a universal, colorful, very visible, easy to operate organizer-reminder, which will include all things they have to secure before leaving the premises.

SUMMARY OF THE INVENTION

It is accordingly an object of the invention
to provide a simple, practical organizer, designed to be a reminder for things to be done to avoid fire, flood, robbery, as well as damages to business, or personal properties and some times even to human life;

to provide such an organizer, which requires a minimum of skill and training to use;

to provide such a self-organizer, which can do a complete job of reminding, controling and checking all potentially dangerous objects which have to be taken care of before leaving the premises.

It is also an object of the invention
to provide a self-organizer which can be used for home or business; to provide simple and practical way by which the necessary safety steps will be always remembered by ourselves, our family members (especially elderly and children), our business associates, etc.;

to provide a self-organizer which puts the end to the worries about items we forgot to check, the end to lost or misplaced notes, that once were jotted down on scraps of paper and lost forever since; to provide self-organizer which has in it everything what needs to be checked for safety, a dependable, reliable, all in one convenient place-reminder.

Practically everybody can benefit from this reminder organizer, because it provides maximum security and assurience with minimum efforts. It will help you to save your home or business. Important things would be impossible to forget now.

According to the nature of the described above self-organizer: 3 different embodiments are offered. They secure house, appartment and business.

Further objects and advantages of the invention will become apparent, from consideration of the following description and the accompanying drawings.

DESCRIPTION OF PREFERRED EMBODIMENTS

Figure 1:
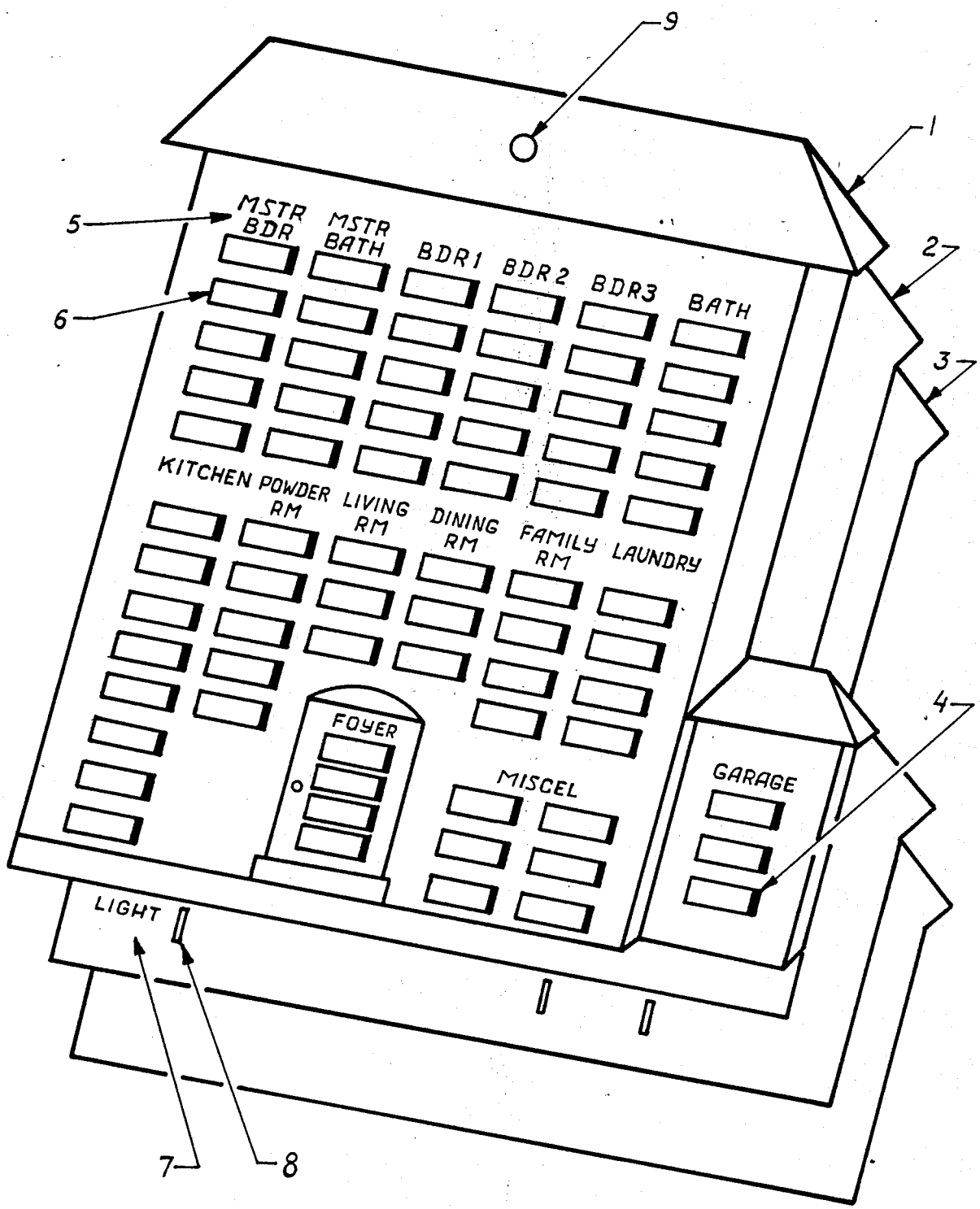
FIG. 1 is an exploded view of an inventive device in accordance with first embodiment.

In all embodiments of the invention the same parts are identified with the same reference numerals. The device in accordance with each of the embodiments has a front panel provided with a plurality of room names 5 and a plurality of windows 6. It has further a middle panel 2 provided with names of dangerous objects 7 and with slots 8 located at one side of the names. Finally the device has a back panel 3. Each tab has a closing portion which is parallel to the panels, and a grasping portion which is transverse to the closing portion.

There are three different versions of self-organizers presented in this application. Each of them designed to cover a specific object such as a house, appartment or business.

Figure 2:
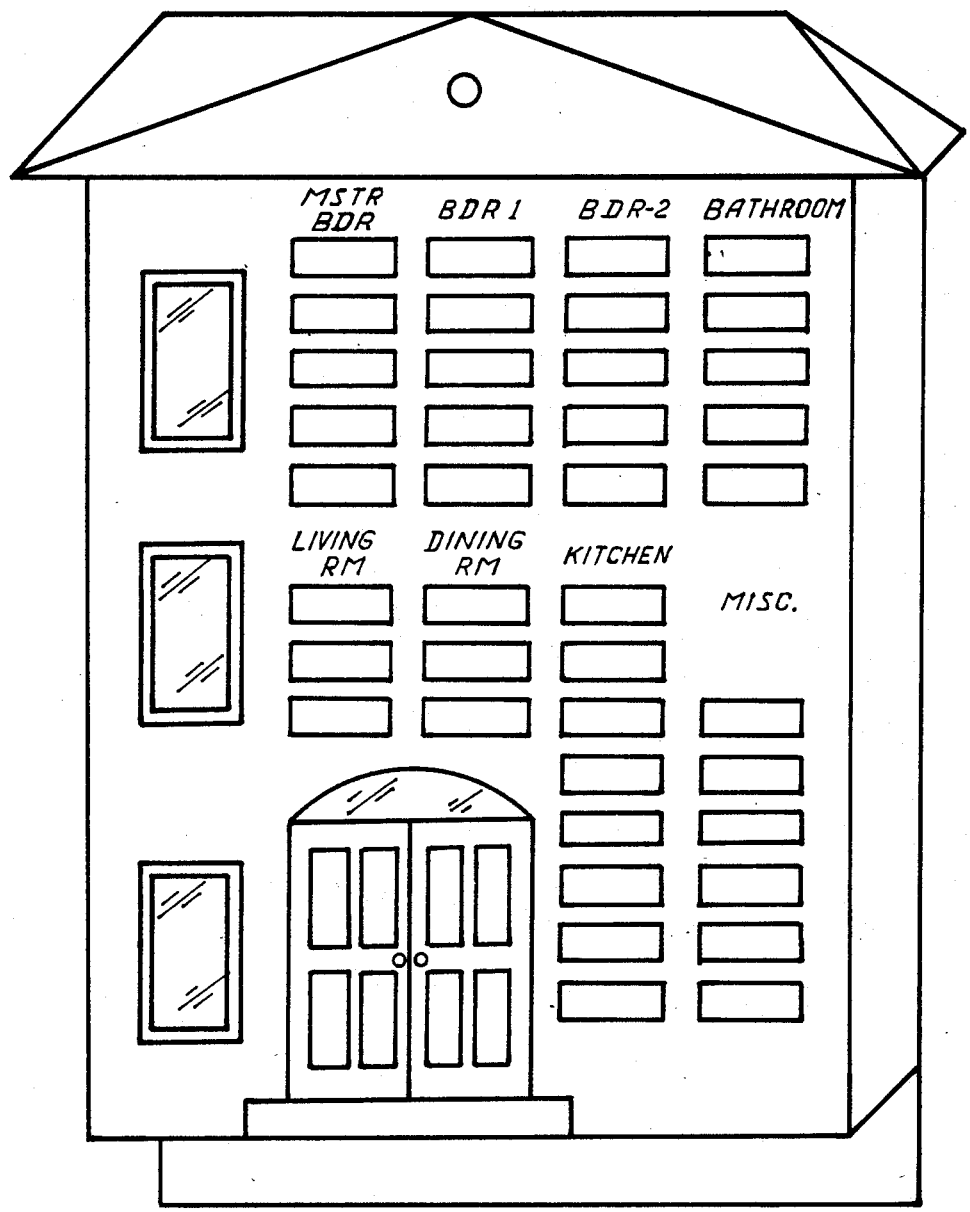
FIG. 2 is a perspective view of the inventive device in accordance with second embodiment.
Figure 3:
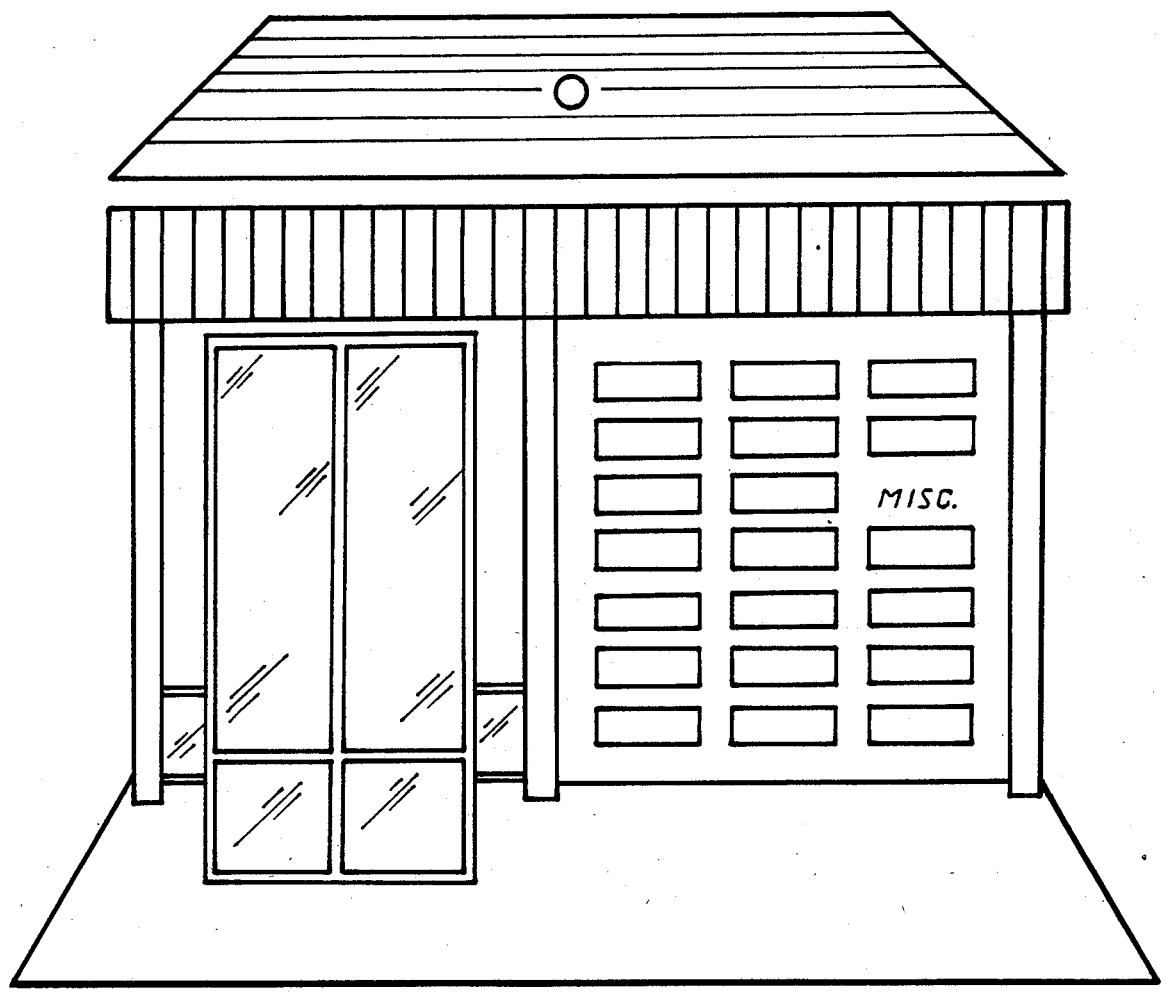
FIG. 3 is a perspective view of the device in accordance with third embodiment.
Figure 4:
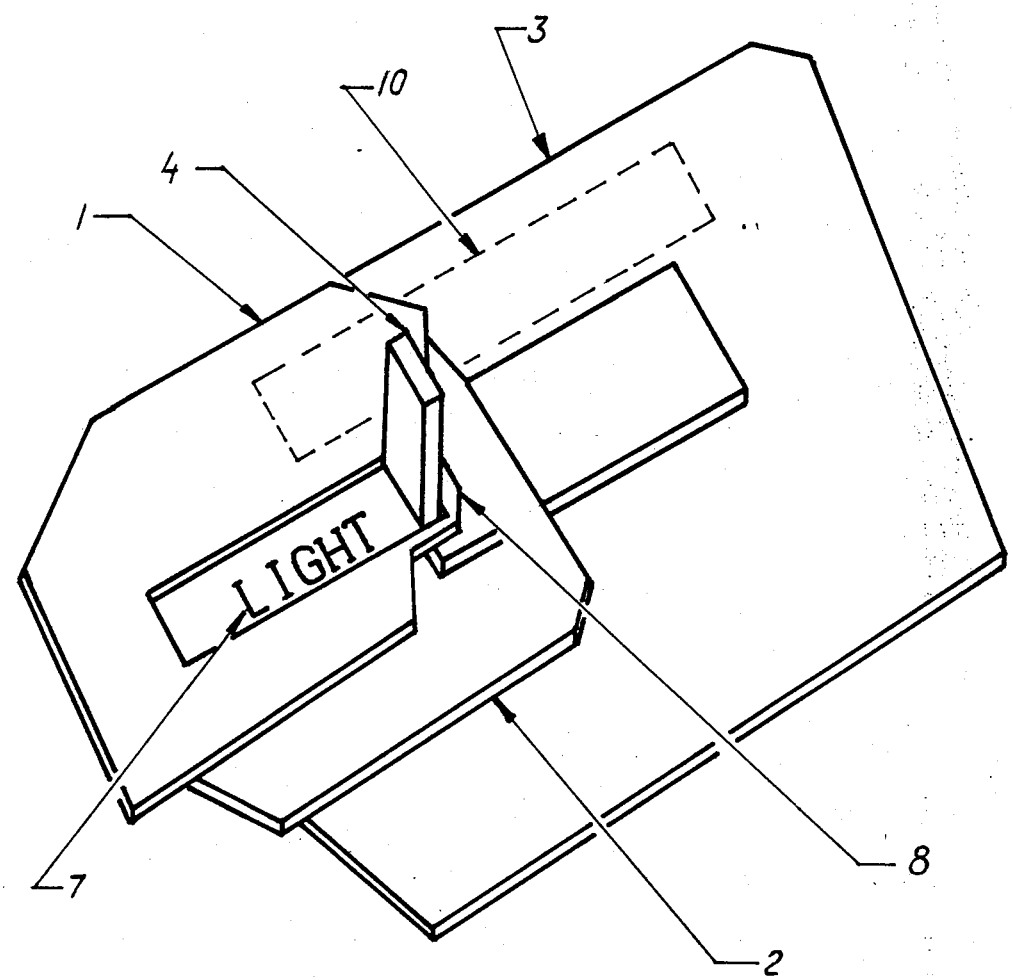
FIG. 4 is a fragment of the inventive device, showing a tab movable relative to a window of the device.
Figure 5:
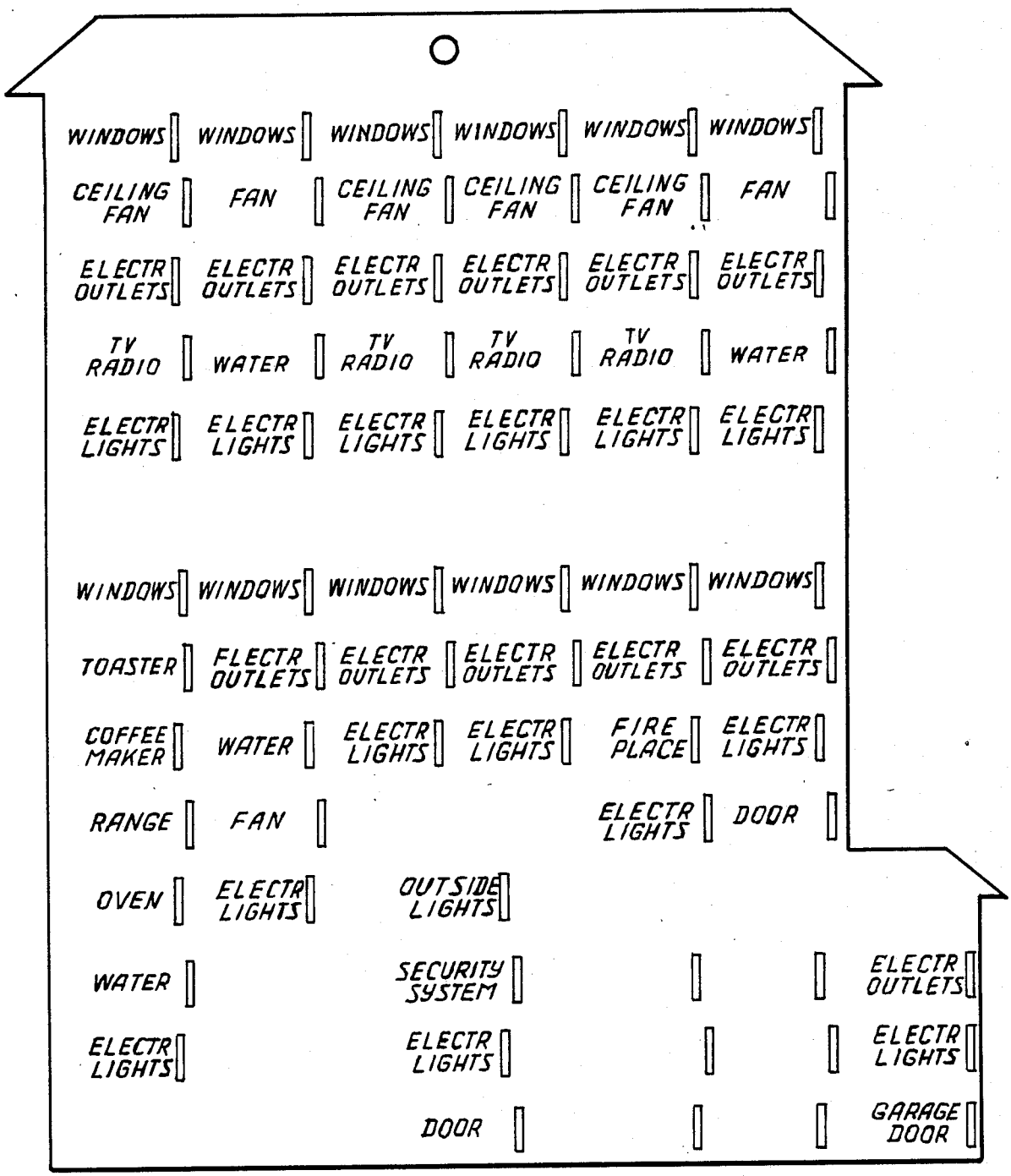
FIGS. 5, 6 and 7 are views showing middle panels of the devices shown in FIGS. 1, 2 and 3.
Figure 6:
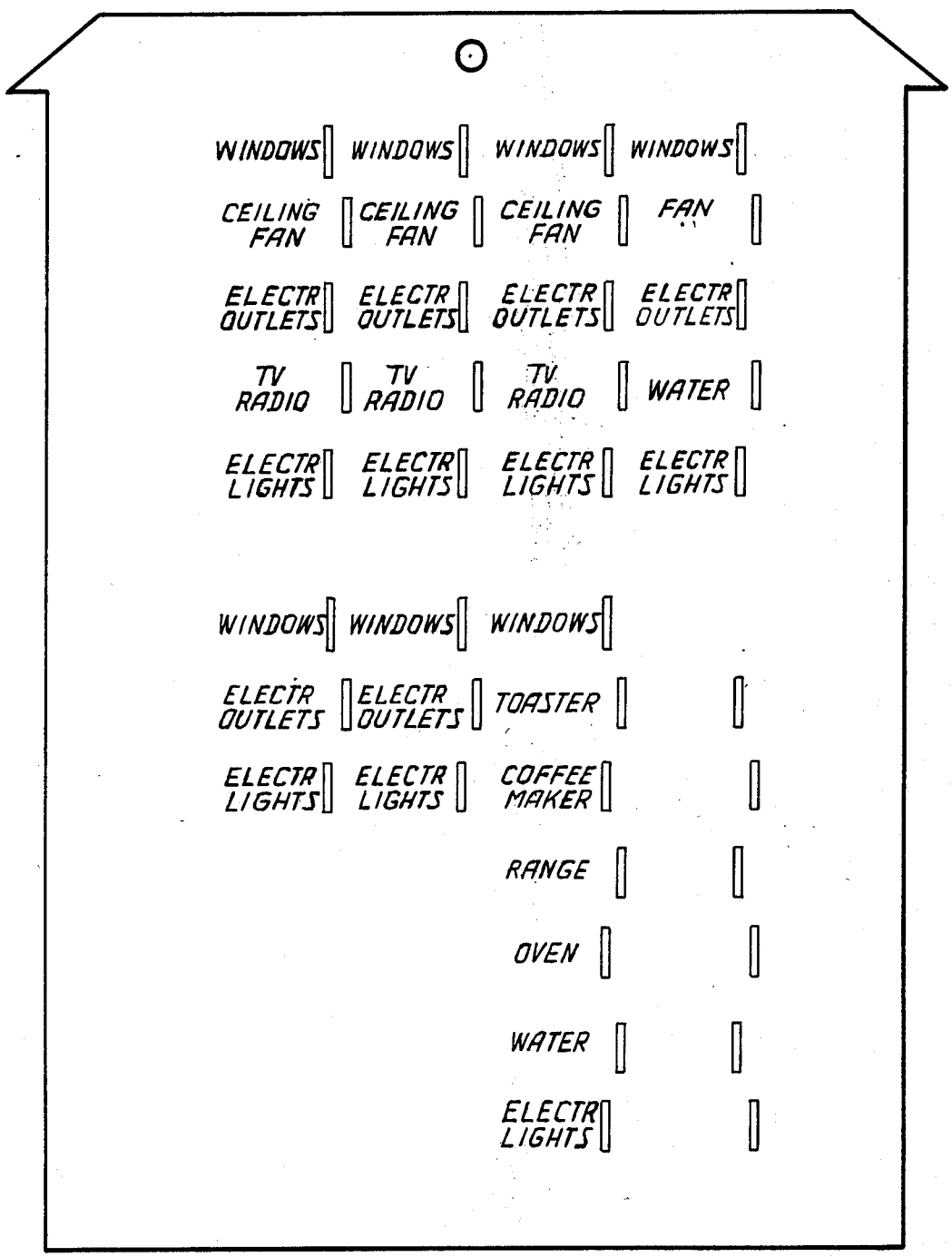
Figure 7:
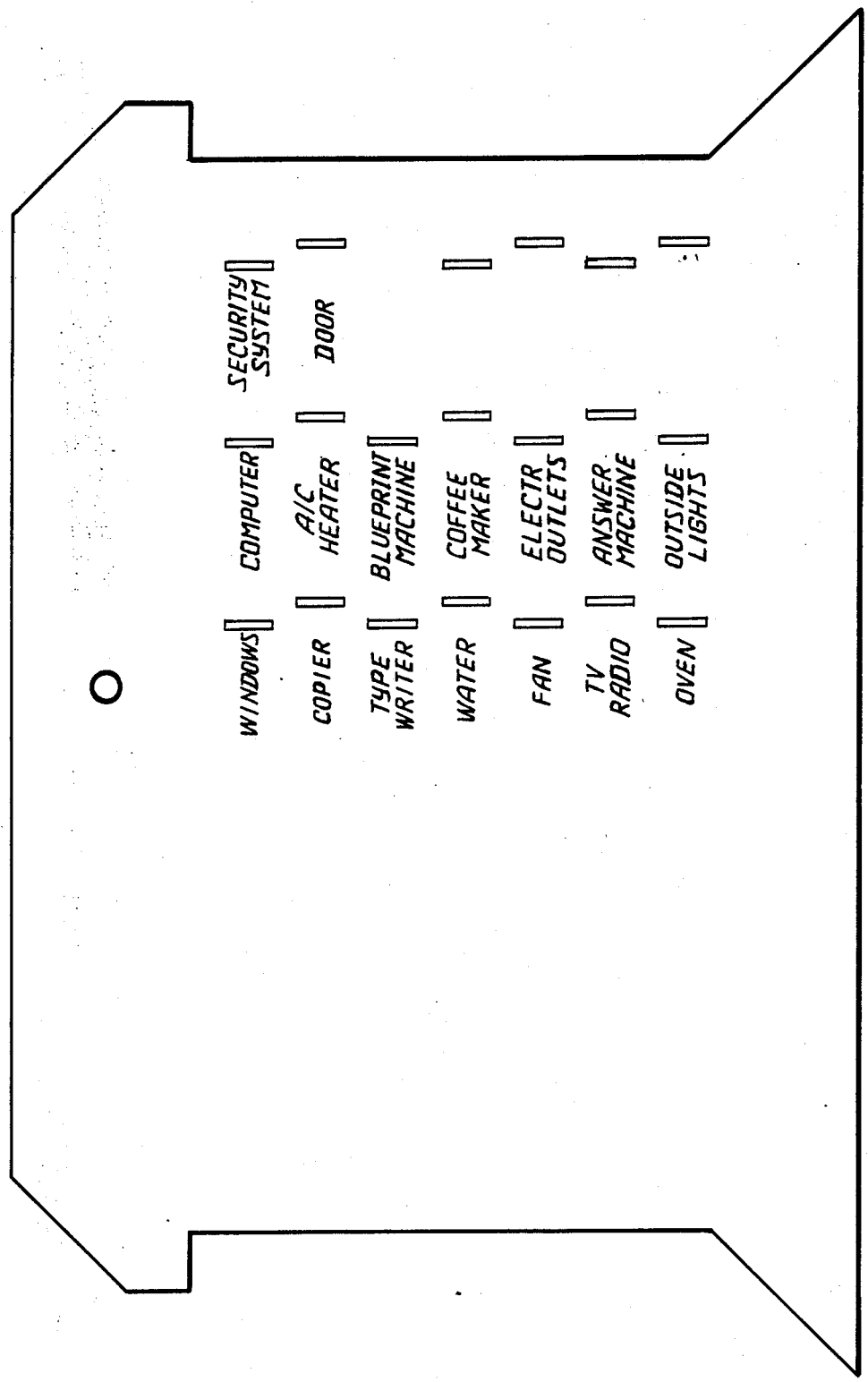

The device shown in FIG. 1 is used for protecting a house, the device shown in FIG. 2 is used for protecting an apartment, and the device shown in FIG. 3 is used for protecting a business office, production area, warehouse, stock room, computer room and other business spaces.

Technically all devices are indentical, therefore description of one device shown in FIG. 1 can be used for describing all of them.

All models are made in shape of a house and they consist of front, middle and back panels.

The front panel item 1 has the windows 6 arranged in several columns. Each column is assigned to a certain room, except "Miscellaneous" which are placed in two separate columns at the bottom of the front panel. The names of the rooms 5 are printed accordingly above each column. All windows in the "Miscellaneous" section are left blank for any additional item which will be bought or installed on the premises.

The middle panel 2 repeats the shape of the front panel 1 and the back panel 3. The plastic tabs item 4 slides into the slot item 8 made in the middle panel item 2, and stays hidden behind it until it will be moved in the opposite direction.

The names of potentially dangerous objects 7 are printed on the panel item 2, matching the windows item 6 in the front panel item 1.

The back panel 3 repeats the shape of the front panel item 1 and middle panel item 2. Three panels are bounded together, making one piece construction. Instructions how to use the device is printed on the back.

The device is used in the following manner. A user walks from room to room, holds device in his hands, and as soon as he has checked the item, grasps a grasping portion of the little tab associated with a respective window so as to move said tab from one side to another. Thereby, a tab closing portion, which extended through a respective slot in the middle panel and was previously hidden behind the middle panel when the above mentioned window of the front panel was open, is now moved so that said closing portion of the tab closes said window.

The item the user has checked is out of danger now.

The user closes all the windows on the device and leaves his home or business with piece of mind.

We claim:

1. A device for reminding a subject to take care of a plurality of objects, comprising a front panel, a middle panel and a back panel which are superposed over one another, said middle panel having a plurality of names of objects to take care of, arranged at predetermined locations, said front panel having a plurality of windows provided at locations which correspond to said locations of said names, said middle panel having a plurality of slots each located at one side of a respective one of said names and therefore at one side of a respective one of said windows, and a plurality of tabs having a closing tab portion extending substantially parallel to said panels and a grasping tab portion extending from said closing tab portion transversely to the latter, said closing tab portions of said tabs being located behind said front panel while said grasping tab portions of said tabs extending through said windows of said front panel, said tabs being movable relative to said windows of said front panel and therefore relative to said names of said middle panel so that when one of said tabs is grasped by a user by said grasping tab portion and moved to one position said closing tab portion is moved away of a respective one of said windows of said front panel into a respective one of said slots of said middle panel and thereby exposes a respective one of said names of said middle panel to show that an object with said exposed name has to be taken care of, and when said one tab is moved in an opposite direction said closing tab portion of said one tab closes said one window of said front panel and covers said one name on said middle panel to show that the object with the previously exposed name has been taken care of.

2. A device as defined in claim 1, wherein said names on said middle panel and said windows in said front panel are arranged in groups, said front panel being provided with further names each identifying a respective one of said groups.

3. A device as defined in claim 2, wherein said further names are names which identify rooms in a dwelling, said first mentioned names are names which identify objects arranged in said rooms of said dwelling, respectively.

4. A device as defined in claim 3, wherein said first mentioned names on said middle panel and said windows in said front panel are arranged in columns, each of said further names on said front panel being located adjacent to a respective one of said columns.

5. A device as defined in claim 1, wherein each of said slots of said middle portion has a predetermined width, said closing tab portion of each of said tabs having a width which substantially corresponds to said width of said slots.

6. A device as defined in claim 1, wherein each of said windows has a predtermined width, said grasping tab portion of each of said tabs having a width which substantially corresponds to the width of said windows.

7. A device as defined in claim 1; and further comprising means for attaching said panels to a supporting surface.

8. A device as defined in claim 7, wherein said attaching means includes at least one hole provided in a top region of at least one of said panels.

9. A device as defined in claim 7, wherein said attaching means includes a magnetic holder arranged on said back panel.

* * * * *